US008459880B2

(12) United States Patent (10) Patent No.: US 8,459,880 B2
Castonguay et al. (45) Date of Patent: Jun. 11, 2013

(54) FIBER OPTIC CONNECTORS, CABLE ASSEMBLIES AND METHODS FOR MAKING THE SAME

(75) Inventors: Guy J. Castonguay, Shanghai (CN); Howard C. Schwartz, Dallas, TX (US); JiWei Sun, Shanghai (CN); Chanh C. Vo, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 13/352,748

(22) Filed: Jan. 18, 2012

(65) Prior Publication Data

US 2012/0121222 A1 May 17, 2012

Related U.S. Application Data

(63) Continuation of application No. PCT/US2009/004421, filed on Jul. 31, 2009.

(51) Int. Cl.
*G02B 6/26* (2006.01)
*B32B 37/14* (2006.01)
*B32B 37/12* (2006.01)

(52) U.S. Cl.
USPC ............... 385/78; 385/76; 385/77; 385/81; 385/97; 385/98; 385/99; 385/137; 156/293

(58) Field of Classification Search
USPC ............ 385/53, 55, 56, 58, 60, 62, 66, 72, 385/76, 77, 78, 81, 100, 95, 97, 98, 99, 137, 385/138, 139; 156/293
See application file for complete search history.

(56) References Cited

U.S. PATENT DOCUMENTS

| 4,838,641 | A | | 6/1989 | Morimoto et al. ......... 350/96.21 |
|---|---|---|---|---|
| 5,436,994 | A | * | 7/1995 | Ott et al. ......................... 385/86 |
| 5,943,460 | A | | 8/1999 | Mead et al. ..................... 385/81 |
| 7,280,733 | B2 | * | 10/2007 | Larson et al. .................. 385/139 |
| 7,347,627 | B2 | | 3/2008 | Saito et al. ..................... 385/60 |
| 7,452,138 | B2 | | 11/2008 | Saito et al. ..................... 385/86 |
| 7,637,673 | B2 | * | 12/2009 | Oike et al. ..................... 385/98 |

(Continued)

FOREIGN PATENT DOCUMENTS

| EP | 2081064 A1 | 7/2009 |
|---|---|---|
| JP | 2005265973 | 9/2005 |

(Continued)

OTHER PUBLICATIONS

Patent Cooperation Treaty, International Preliminary Report on Patentability, Feb. 9, 2012, 12 pages.

*Primary Examiner* — Brian Healy
(74) *Attorney, Agent, or Firm* — Michael E. Carroll, Jr.

(57) ABSTRACT

Disclosed are fiber optic connectors including a holder for attaching a fiber optic cable to a fiber optic connector along with cable assemblies and methods for making the same. In one embodiment, the holder includes a first and a second cantilevered arm that are squeezed together when a sleeve is placed over the holder. Further, one or more of the cantilevered arm may include a plurality of teeth for "biting" into the cable jacket and providing a suitable fiber optic cable retention force. The fiber optic connectors, cable assemblies and methods disclosed herein are advantageous since they allow the craft to quickly, reliably, and easily attach a robust fiber optic cable to a connector, thereby providing a rugged solution for the craft.

43 Claims, 15 Drawing Sheets

U.S. PATENT DOCUMENTS

| | | | |
|---|---|---|---|
| 2007/0104425 A1 | 5/2007 | Larson et al. | 385/86 |
| 2007/0217751 A1 | 9/2007 | Doss et al. | 385/95 |
| 2008/0247710 A1* | 10/2008 | Oike et al. | 385/78 |
| 2008/0304795 A1* | 12/2008 | Oike et al. | 385/81 |
| 2012/0121222 A1* | 5/2012 | Castonguay et al. | 385/78 |

FOREIGN PATENT DOCUMENTS

| | | |
|---|---|---|
| JP | 2005265975 | 9/2005 |
| JP | 2005283954 | 10/2005 |
| JP | 200630663 | 2/2006 |
| JP | 200630669 | 2/2006 |
| JP | 200765248 | 3/2007 |
| JP | 2007240855 | 9/2007 |
| JP | 2007240943 | 9/2007 |
| JP | 200889703 | 4/2008 |
| WO | WO2006/019161 A1 | 2/2006 |
| WO | WO2006019515 A1 | 2/2006 |
| WO | WO2006019516 A1 | 2/2006 |
| WO | WO 2007053546 A1 * | 5/2007 |

* cited by examiner

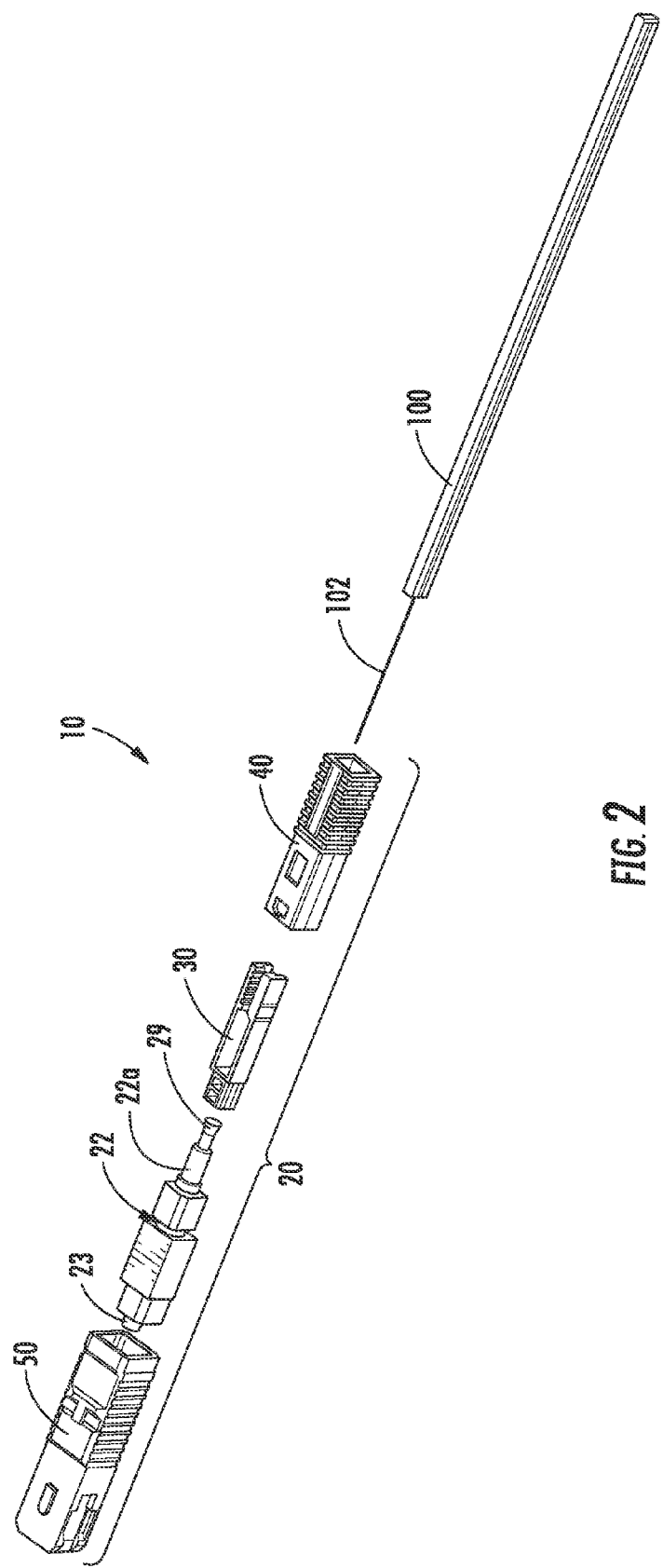

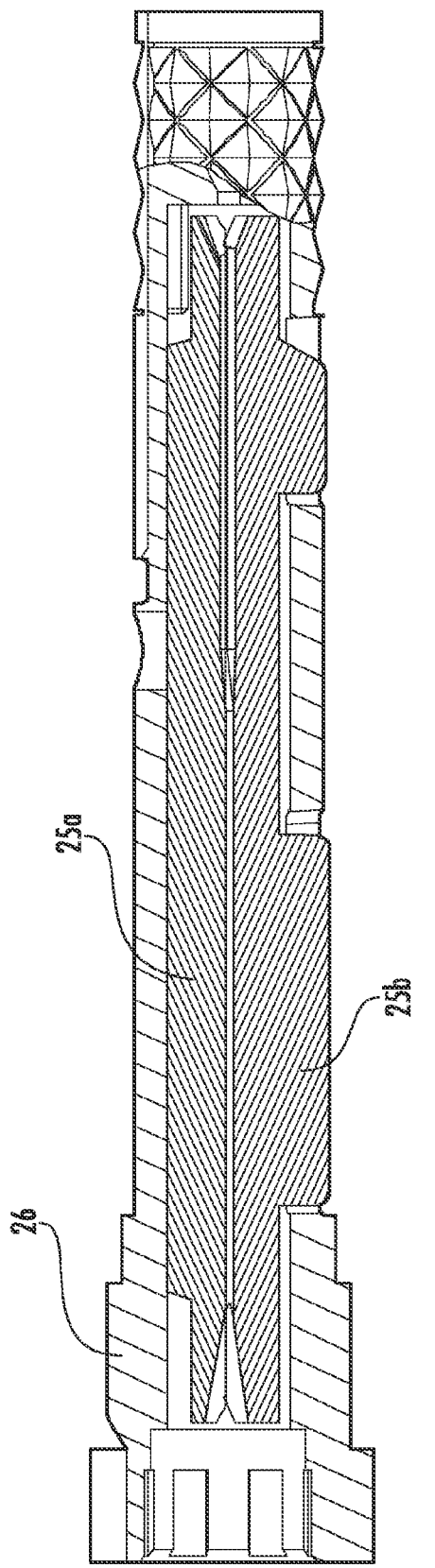

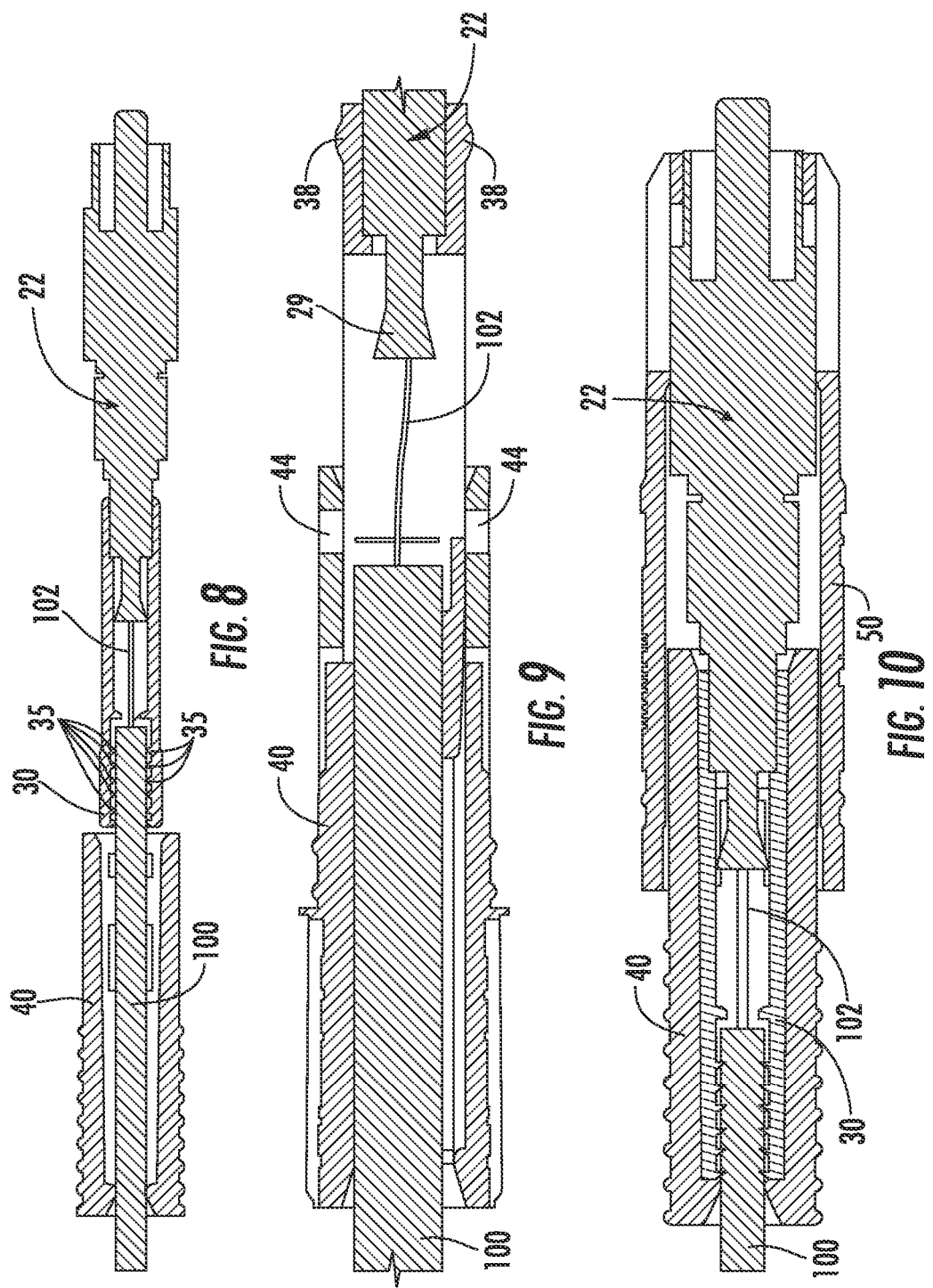

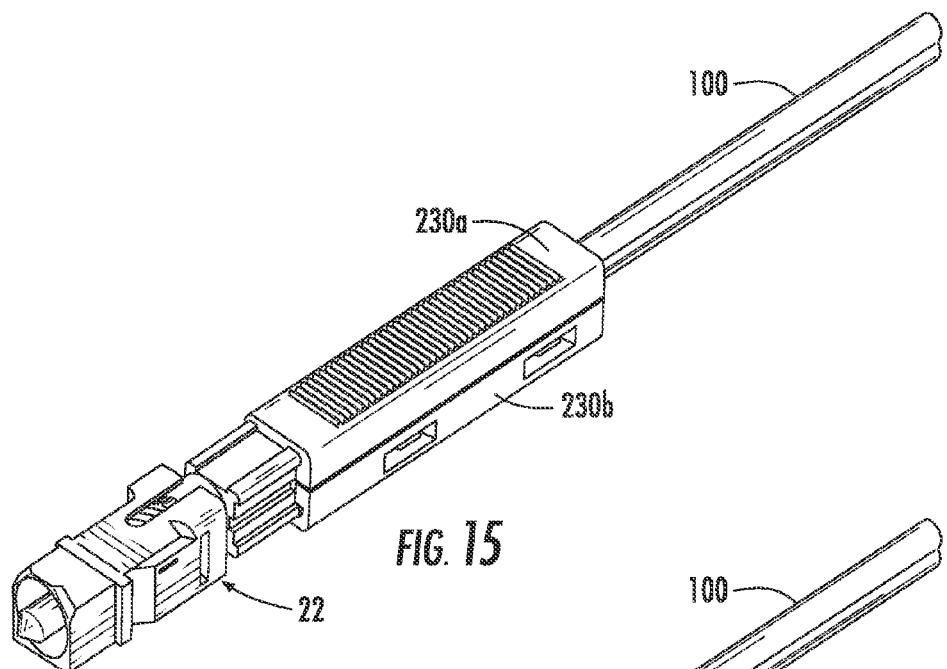
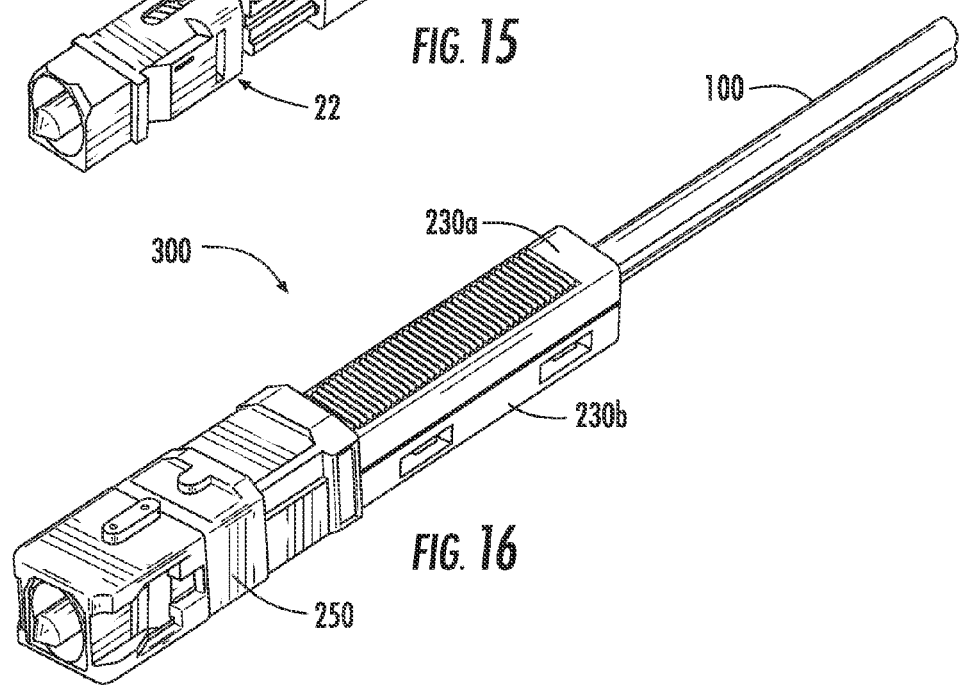
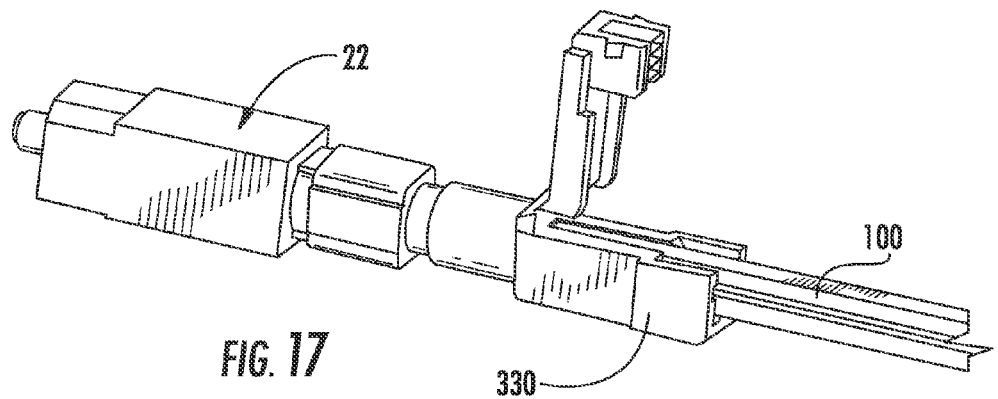

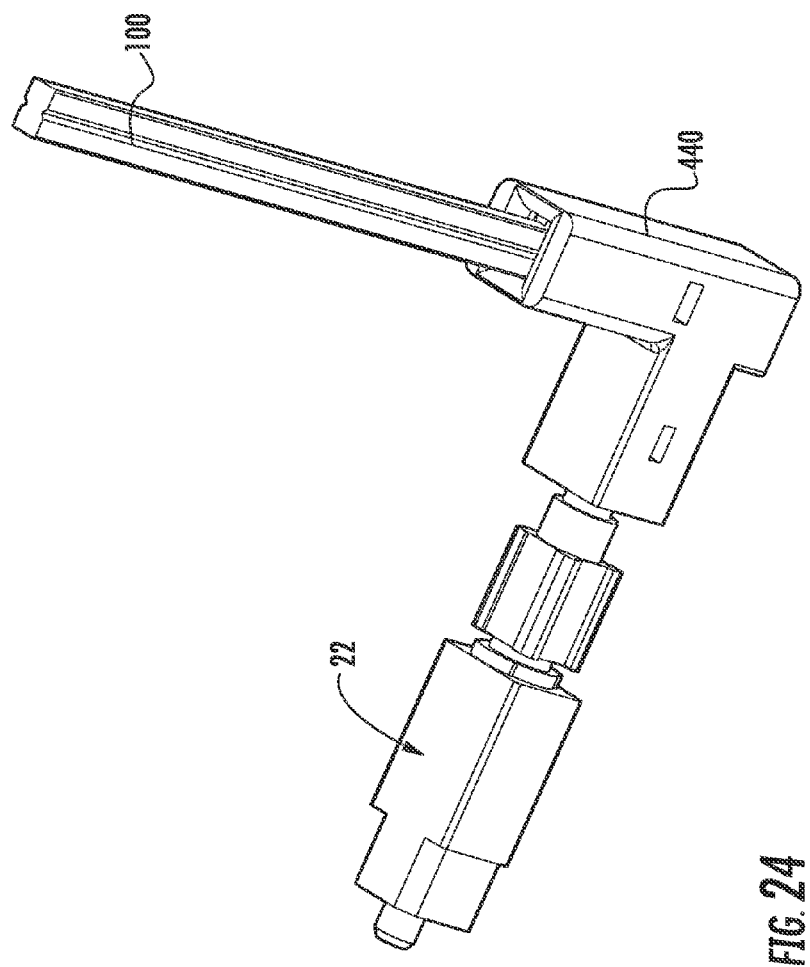
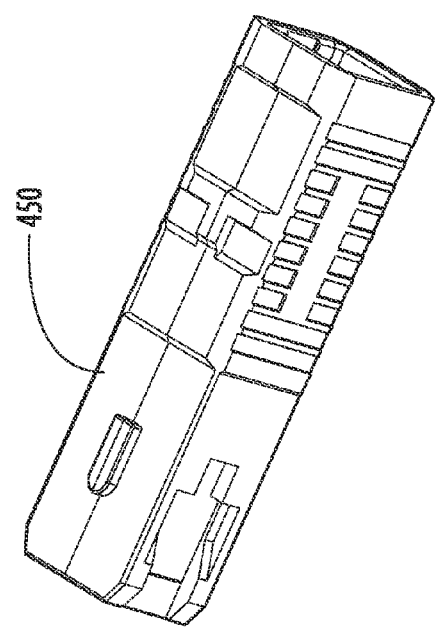
FIG. 24

FIBER OPTIC CONNECTORS, CABLE ASSEMBLIES AND METHODS FOR MAKING THE SAME

PRIORITY APPLICATION

This application is a continuation of International Patent Application Serial No. PCT/US09/04421 filed on Jul. 31, 2009, designating the United States of America, the content of which is relied upon and incorporated herein by reference in its entirety.

BACKGROUND

1. Field

The present disclosure relates generally to fiber optic connectors, cables assemblies and methods for making the same. Specifically, the disclosure is directed to fiber optic connectors, cable assemblies and methods that use a holder for attaching the fiber optic cable to the connector.

2. Technical Background

Fiber optic communication networks are experiencing explosive growth. In just a few years, the transmission of optical communication signals for voice, video, data, and the like has soared. The future growth of fiber optical networks is necessary because subscribers are still demanding more bandwidth. To accommodate the bandwidth demand, network operators are investing in and installing optical networks to route optical fibers toward the user. In certain applications, the craft prefers to terminate the ends of fiber optic cable in the field to avoid issues with excess cable length and slack storage. However, conventional connectors require finishing the ferrule endface which is time-consuming and best accomplished in a factory setting with dedicated polishing and inspection equipment.

To solve these connector termination issues, mechanical splice connectors such as the UniCam® available from Corning Cable Systems of Hickory, N.C. were developed. The UniCam® connector allows the craft to easily, quickly and reliably make a mechanical splice connection between a field-fiber and an optical fiber stub of the connector without the need to polish a ferrule endface of the connector. Initially, mechanical splice connector were intended for termination with indoor fiber cables that included aramid fibers or the like as strength members. Specifically, the aramid fibers or the like were secured to a portion of the connector using a deformable crimp tube. However, with the push of FTTx to subscribers the craft desires to terminate mechanical splice connectors to more robust fiber optic cables. Manufacturers have attempted to develop mechanical splice connectors that terminate these robust fiber optic cables, but to date the designs require complicated components, numerous components, are difficult to manufacture, useful with only a single cable design, and/or expensive.

SUMMARY

The disclosure relates to mechanical splice fiber optic connectors that are reliable, simple, and easy for the craft to install with all types of fiber optic cables. The fiber optic connectors disclosed herein have a holder for attaching a fiber optic cable to a fiber optic connector along with cable assemblies and methods for making the same. A first end of the holder attaches to a portion of a fiber optic connector and a second end of the holder attaches to a fiber optic cable. The fiber optic connectors, cable assemblies and methods disclosed herein are advantageous since they allow the craft to quickly, reliably, and easily attach a robust fiber optic cable to a connector, thereby providing a rugged solution for the craft.

Additional features and advantages are set forth in the detailed description that follows, and in part will be readily apparent to those skilled in the art from that description or recognized by practicing the concepts described herein, including the detailed description that follows, the claims, and the appended drawings. It is to be understood that both the foregoing general description and the following detailed description present exemplary embodiments, and are intended to provide an overview or framework for understanding the nature and character of the invention as it is claimed. The accompanying drawings are included to provide a further understanding of the concepts, and are incorporated into and constitute a part of this specification. The drawings illustrate various embodiments, and together with the detailed description, serve to explain the principles and operations thereof.

BRIEF DESCRIPTION OF THE DRAWINGS

These and other features, aspects and advantages are better understood when the following detailed description is read with reference to the accompanying drawings, in which:

FIG. 2 is a partially exploded view of the fiber optic connector of FIG. 1;

FIG. 2B is a partial cross-sectional view of a portion of the mechanical splice assembly showing the splice parts;

FIGS. 8 and 9 depict cross-sectional views of a portion of the fiber optic cable assembly during assembly;

FIG. 10 shows a cross-sectional perspective view of the cable assembly of FIG. 1;

FIGS. 14-16 depict perspective views of another fiber optic connector being assembled;

FIG. 17 depicts a perspective views of another partially assembled fiber optic connector;

FIGS. 23 and 24 depict partially exploded perspective views of a fiber optic cable assembly having an angled connector.

DETAILED DESCRIPTION

Reference is now made to preferred embodiments, examples of which are illustrated in the accompanying drawings. Whenever possible, the same or similar reference numbers and symbols are used throughout the drawings to refer to the same or similar parts.

Figure 1:
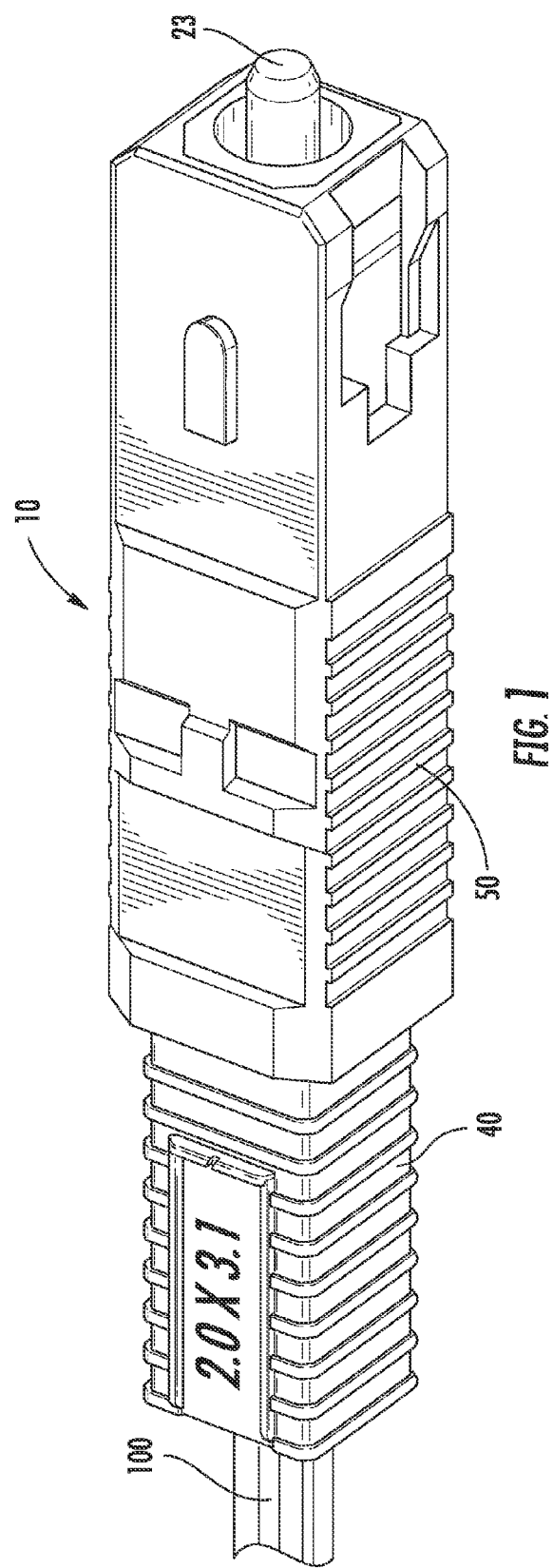
FIG. 1 is a perspective view of a fiber optic cable assembly having a fiber optic connector attached to a fiber optic cable.

FIG. 1 is a perspective view of a fiber optic cable assembly 10 (hereinafter cable assembly) having a fiber optic connector 20 (hereinafter connector) attached to a fiber optic cable 100. Cable assembly 10 can include any suitable fiber optic cable and/or type of connector according to the concepts disclosed herein. For instance, the connector type may include SC, LC, MT-RJ, MT, MU, or the like. Additionally, FIGS. 18-22 depict explanatory fiber optic cables suitable for use with the connectors disclosed herein. Generally speaking, fiber optic cables useful with the disclosed connectors generally are robust cable designs with strength members that have an anti-buckling characteristic such as glass-reinforce plastic, fiberglass, or the like, but the use of other suitable cable types are possible. Connector 20 includes a suitable mechanical splice assembly such as similar to the connectors available under the tradenames UniCam®, OptiSnap™, CamLite® from Corning Cable Systems of Hickory, N.C., but other suitable mechanical splice assemblies are possible. Moreover, the mechanical splice assemblies may be a single-fiber assembly or a multifiber assembly. The connectors disclosed herein are advantageous since it allows the craft to quickly and reliably attach a robust drop cable to make a cable assembly, thereby providing a rugged solution that is easy to install in the field.

Figure 2A:
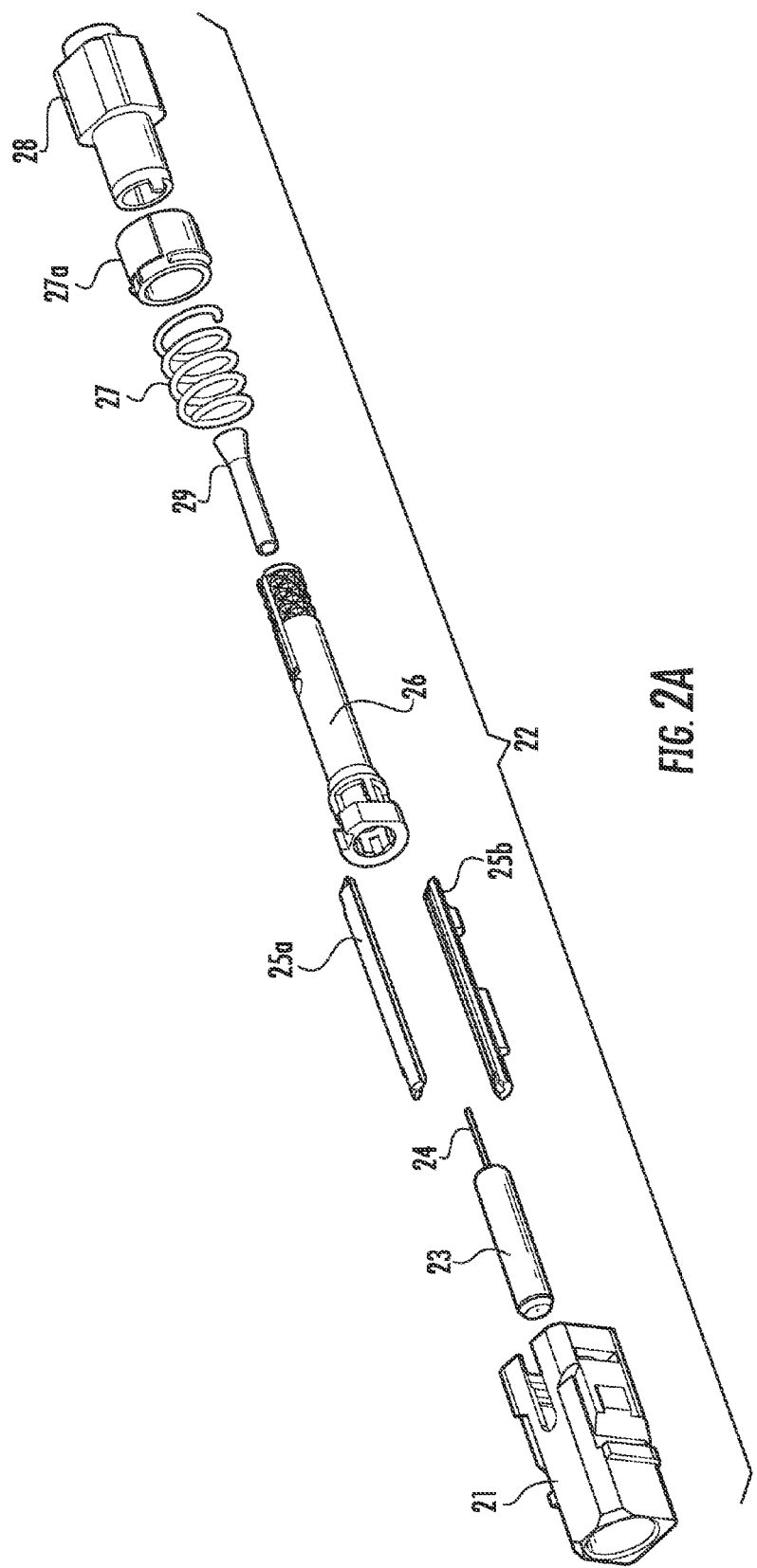
FIG. 2A shows an exploded view of the mechanical splice assembly of FIG. 2.

FIG. 2 is a partially exploded view of FIG. 1 showing connector 20 and fiber optic cable 100. Specifically, connector 20 includes mechanical splice assembly 22 having a ferrule 23, a holder 30, a sleeve 40, and an outer housing 50. As best shown, in FIG. 2A, ferrule 23 of mechanical splice assembly 22 has a stub optical fiber 24 attached thereto. The stub optical fiber 24 is attached to ferrule 23 and an endface of the ferrule (with the optical fiber stub) is finished in the factory, thereby eliminating these finishing steps for the craft. Likewise, the free end of the stub optical fiber 24 is prepared to the desired length in the factory using any suitable method such as laser processing or the like and may have any suitable endface such as straight, angled, pencil-tip, etc. Consequently, the craft can prepare cable assembly 10 in the field by simply making a mechanical splice connection between stub optical fiber 24 and optical fiber 102 of fiber optic cable 100, thereby allowing a custom optical fiber connection between the optical fibers.

FIG. 2A depicts an exploded view of mechanical splice assembly 22. Mechanical splice assembly 22 includes a mechanical splice housing 21, a ferrule 23, stub optical fiber 24, splice parts 25a, 25b, a splice assembly housing 26, a spring 27 and spring retainer 27a, an activation mechanism 28, and a lead-in tube 29. However, other suitable mechanical splice assemblies can have fewer or more components. Likewise, the mechanical splice assemblies 22 may use any suitable activation mechanism 28. By way of example, a suitable activation mechanism 28 may be a cam that biases the splice parts together using the rotation of an eccentric (i.e., rotational activation), thereby securing optical fiber 102 and stub optical fiber 24 in position for making the optical connection. FIG. 2B depicts a cross-sectional view of splice parts 25a, 25b disposed within splice assembly housing 26. As shown, the keel (not numbered) of splice part 25b extends through a window of splice assembly housing 26 so that the cam can bias the splice parts together when rotated to the proper position as known in the art. In other embodiments, the activation mechanism of the mechanical splice connector may be a wedge that uses a linear activation in a generally parallel direction to the axis of the connector or a push button activation mechanism that use a linear activation in a transverse direction to the axis of the connector. Other suitable mechanisms for biasing one or more of the splice parts 25a, 25b together for securing optical fiber 102 and stub optical fiber 24 are also possible. Furthermore, the splice parts may be suitable for securing a portion of bare optical fiber, coated optical fiber, a portion of a buffered optical fiber, or combinations thereof by sizing one or more grooves on the splice parts accordingly.

Additionally, the activation mechanism may include a deactivation and/or reactivation feature for allowing the release of the splice parts if the mechanical splice does meet the desired performance level. In other words, the craft can undo the splice by releasing the bias on the splice parts and reposition and/or re-cleave the optical fiber and then reposition/re-insert the optical fiber to make a suitable mechanical splice connection. By way of example, the cam may be rotated in one direction to bias the splice parts together and rotation of the cam in the other direction releases the bias on the splice parts.

As known in the art, one or more of the components of the mechanical splice assembly may be translucent so the craft and/or a tool can view the glow of the mechanical splice for evaluating the continuity of the mechanical splice as known. For instance, U.S. Pat. No. 6,816,661 discloses methods for evaluating the continuity of the mechanical splice. In the embodiment depicted, mechanical splice assembly 22 uses a cam as the activation mechanism 28. Moreover, the cam and the splice parts are translucent so the craft and/or tool may view the glow of the mechanical splice to evaluate the continuity of the mechanical splice.

Figure 3:
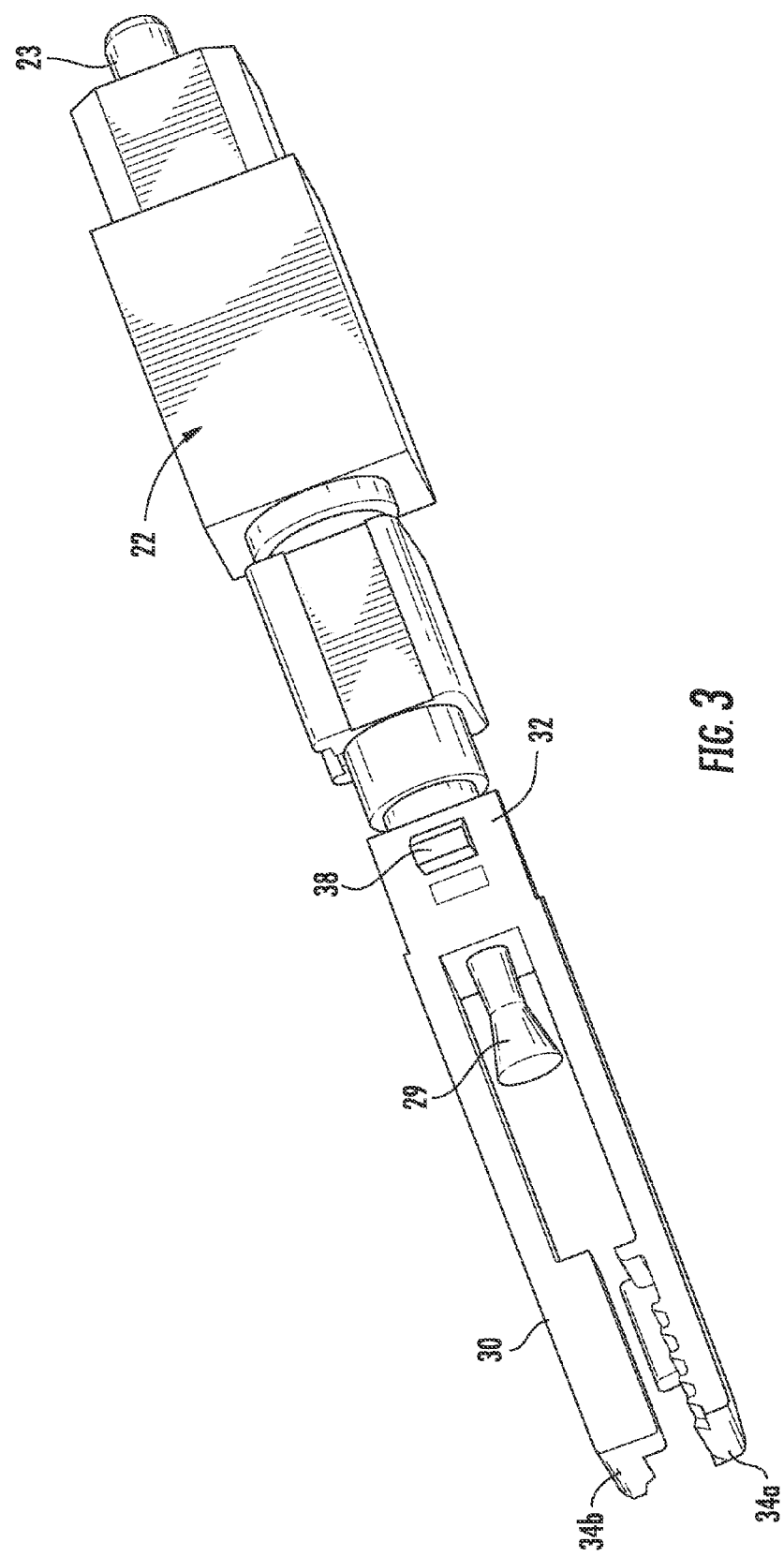
FIG. 3 is a perspective view of a partially assembled fiber optic connector of FIG. 1 before the fiber optic cable is inserted into the fiber optic connector.

FIG. 3 shows a perspective view of a portion of connector 20 before attaching fiber optic cable 100 thereto. Holder 30 has a first end 32 for attaching to a portion of fiber optic connector 20 and a second end 34 for securing to a portion of fiber optic cable 100 such as by clamping to the cable jacket 108 of fiber optic cable 100. As shown, the components of mechanical splice assembly 22 are assembled and holder 30 is placed about a portion of the connector 20 such as a rear portion of the connector. Specifically, first end 32 of holder 30 has a passageway (not numbered) sized to fit over a collar 22a disposed at the rear end of mechanical splice assembly 22. In this embodiment, holder 30 is attached to sleeve 22a using a suitable adhesive like glue, epoxy, or the like. Other methods for attaching holder 30 to a portion of the connector 20 are possible such as a snap-fit, interference fit, crimping, threads or the like so long as the attachment has the desired strain relief (i.e., retention force) between the holder 30 and mechanical splice assembly 22 for the cable assembly. In this embodiment, holder 30 is placed about the rear portion of mechanical splice assembly 22 so that lead-in tube 29 extends into an interior space of holder 30 as shown. In preferred embodiments, holder 30 is attached to mechanical splice assembly 22 in the factory for providing a craft-friendly field solution. In other words, the connector bag of parts from the factory is ready to receive a properly prepared fiber optic cable with just a few parts requiring assembly in the field. Holder 30 and sleeve 40 may also be provided individually for use with a standard mechanical splice connector since lead-in tube 29 of mechanical splice assembly 22 may also function as a crimp tube for attaching aramid fiber strength member or the like.

The second end 34 of holder 30 is configured for securing a portion of fiber optic cable 100 thereto. The second end 34 of holder 30 is sized for any suitable shaped and/or sized fiber optic cable. Thus, the disclosed design is advantageous since the holder may be modified to work with many different types/sizes of fiber optic cables such as available from different cable manufacturers. In this embodiment, second end 34 of holder 30 includes a first cantilevered arm 34a and a second cantilevered arm 34b that extend rearward for securing to a portion of fiber optic cable 100 therebetween. Specifically, first cantilevered arm 34a and second cantilevered arm 34b can deflect towards each other for clamping to a portion of fiber optic cable 100. As shown in FIG. 3, first cantilevered arm 34a and second cantilevered arm 34b may include one or more stops (not numbered) for aiding in the proper placement of fiber optic cable 100 between the cantilevered arms. In other words, the stops aid in the proper placement of the fiber optic cable in one or more directions such as fully seated in a longitudinal direction of the connector and/or the vertical direction within the holder 30. The sizing of the stops may be dependent on the specific cable design/size intended for the cable assembly, but the size and/or shape of the stops may be adjusted accordingly to the fiber optic cable. In other embodiments, the holder may have a single cantilevered arm or use other structure to secure the fiber optic cable.

As best shown in FIG. 8, cantilevered arms 34a,34b may also include one or more gripping teeth 35 for "biting" into a cable jacket 108 of fiber optic cable 100. Gripping teeth 35 are designed to bite into the cable jacket 108 of fiber optic cable 100 as the sleeve 40 is slid onto holder 30 during assembly, thereby squeezing cantilevered arms 34a,34b into the cable jacket. As shown, both cantilevered arms 34a,34b include a plurality of gripping teeth 35 for biting into the cable jacket of fiber optic cable 100; however, other embodiments may not use gripping teeth or use gripping teeth on only one cantilevered arm. Additionally, specific shaping of teeth 35 such as canted forward (i.e., asymmetrical) may inhibit movement and/or apply a forward force to the fiber optic cable 100 when the cantilevered arms are squeezed into the cable jacket 108, thereby improving gripping of the cable and strain relief (i.e., the fiber optic cable retention). By way of example, teeth 35 have a height (not numbered) between about 0.002 inches (0.05 millimeters) and about 0.010 inches (0.254 millimeters) for "biting" into cable jacket, preferably, between about 0.004 inches (0.10 millimeters) and about 0.008 inches (0.20 millimeters) depending on materials characteristics and/or the shape of the teeth 35. Thus, the assembly provides a fiber optic cable retention force (i.e., a cable pull-out force) of at least 10 Newtons, more preferably about at least 20 Newtons.

Figure 6:
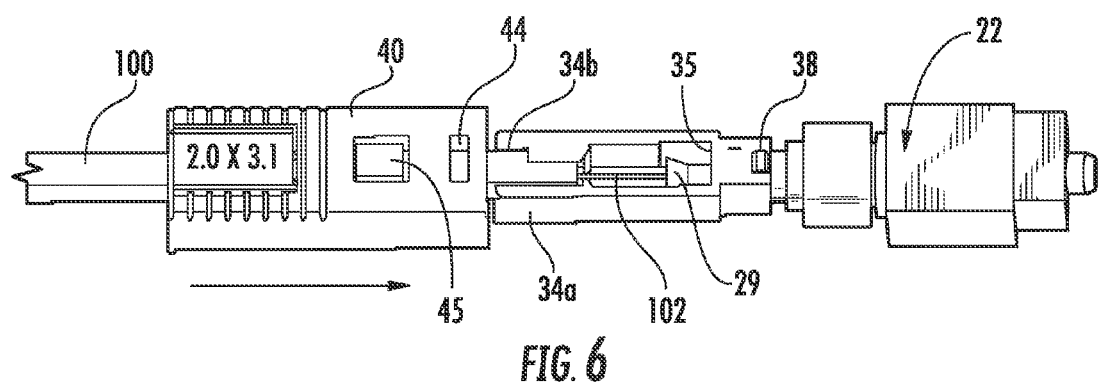
FIG. 6 is an assembly view showing the sleeve of the fiber optic connector of FIG. 1 being slid onto a portion of the holder.

Holder 30 and sleeve 40 may also have cooperating structure for inhibiting unintended disassembly therebetween. Specifically, holder 30 also includes one or more protrusions 38 for latching with one or more portions of sleeve 40, thereby inhibiting separation of the sleeve 40 from the holder 30 after assembly. Holder 30 and sleeve 40 may also have cooperating structure to inhibit over-insertion of sleeve 40 onto holder 30. Illustratively, sleeve 40 includes one or more stops 45 for abutting to a surface 35 located on holder 30. Stops 45 project slightly inward toward the passageway of sleeve 40 so that they abut surface 35 as best shown in FIG. 6. Sleeve 40 includes two stops 45 disposed on opposite sides. Further, it is possible to form holder 30 from any suitable material(s). By way of example, holder 30 is formed from a suitable polymer such as available under the tradename ULTEM® available from GE Plastics; however, other suitable polymers and/or composite of materials are possible.

Figure 4:
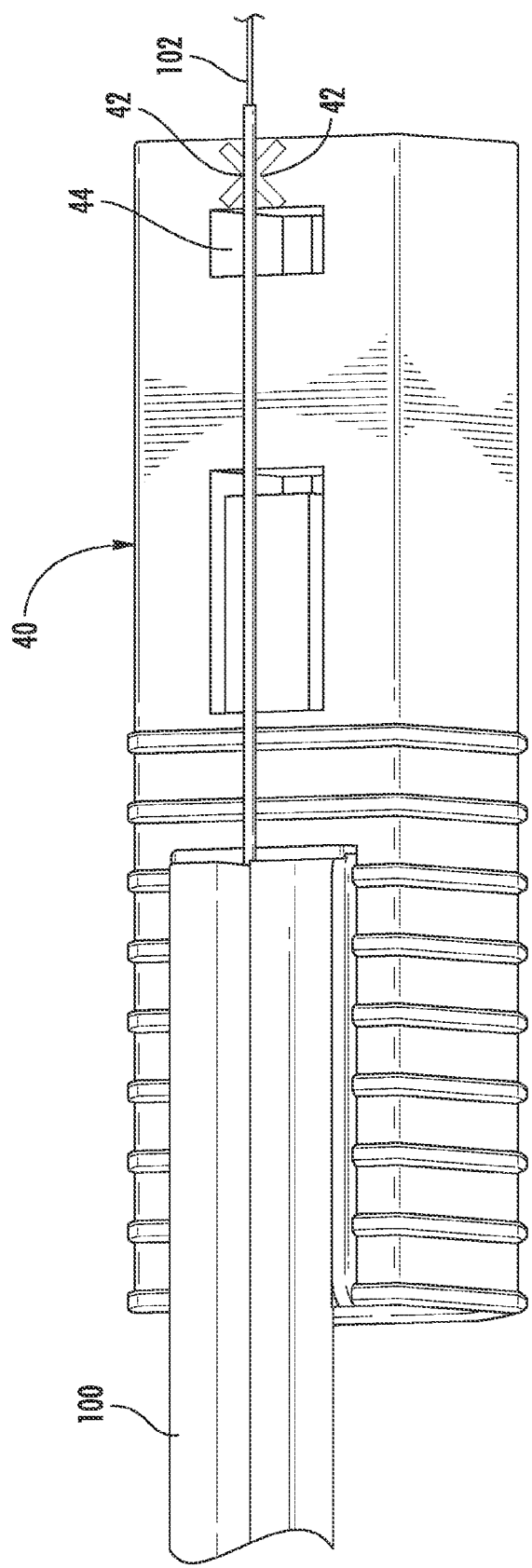
FIG. 4 is a view showing a stripping gauge formed on the sleeve of the fiber optic connector for determining the length for stripping the coating of the optical fiber.

Fiber optic cable 100 is suitable prepared for assembly by exposing, stripping and cleaving the optical fiber to the proper lengths for attaching to connector 20. In one embodiment, sleeve 40 can have one or more gauges or indicators for aiding the craft in preparing the fiber optic cable for termination with connector 20. Illustratively, FIG. 4 is a perspective view showing fiber optic cable 100 positioned on sleeve 40. As shown, sleeve 40 has a relieved portion (see FIG. 6 for unobstructed view) for positioning a prepared portion of fiber optic cable 100 therein. Relative to relieved portion, a stripping gauge 42 is positioned on the other end of sleeve 40. In this embodiment, stripping gauge 42 includes a plurality of arrows to indicate a minimum length of coating (i.e., 250 micron coating) that should remain on optical fiber 102 from an endface of the cable jacket 108 that is placed in the relieved portion of sleeve 40. Thus, the craft does not have to mark and measure the correct distance for the stripped portion of optical fiber 102. Additionally, the sleeve 40 may have a marking (not numbered) indicating what size fiber optic cable 100 that the connector 20 is suitable for terminating. By way of example, sleeve 40 includes the marking "2.0×3.1" indicating that connector 20 is suitable for that size fiber optic cable as shown.

Figure 5:
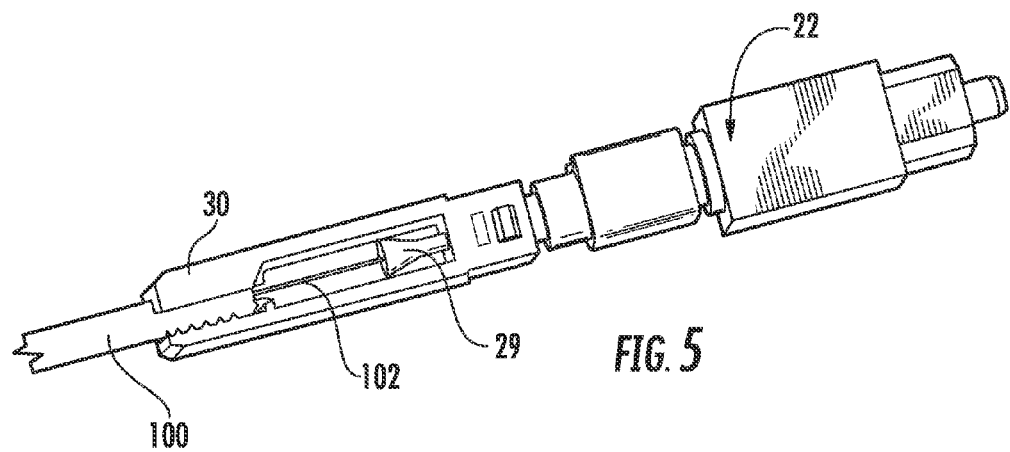
FIG. 5 is an assembly view showing the prepared fiber optic cable inserted into a portion of the fiber optic connector of FIG. 3 before the sleeve is slid into place.

After fiber optic cable 100 is properly prepared by exposing, stripping and cleaving optical fiber it is ready for inserting into the holder 30 attached to mechanical splice assembly 22. First, sleeve 40 is threaded onto fiber optic cable 100 in the proper orientation for sliding forward onto holder 30 once the fiber optic cable 100 and optical fiber 102 are properly placed within the intended portions of connector 20. FIG. 5 is an assembly view showing the prepared fiber optic cable 100 inserted into a portion of fiber optic connector 20 before the sleeve 40 is slid into place. As shown, fiber optic cable 100 is positioned so that optical fiber 102 is inserted into lead-in tube 29, thereby guiding optical fiber 102 in between the splice parts 25a, 25b of the mechanical splice assembly 22. Also, fiber optic cable 100 is properly positioned so that it generally abuts the appropriate stops of holder 30. Thereafter, sleeve 40 is slid onto a portion of holder 30 as represented by the arrow in FIG. 6 and FIG. 7, thereby squeezing the teeth 35 and/or cantilevered arms 34a, 34b into the cable jacket of fiber optic cable 100.

Figure 7:
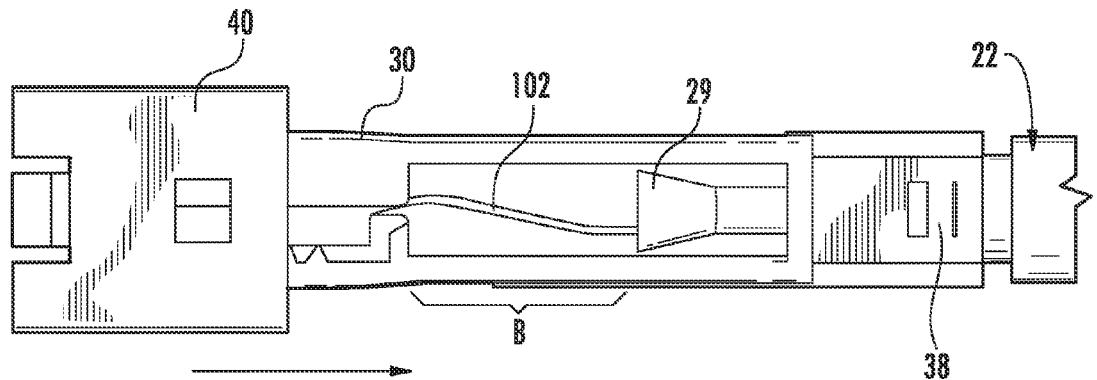
FIG. 7 is an assembly view showing the sleeve of the fiber optic connector bending the optical fiber as it is being slid onto the holder.

As shown in FIG. 7, sliding sleeve 40 about a portion of holder 30 may advantageously cause optical fiber cable 100 to slide forward slightly and create a bend B in optical fiber 102. Creating a bend in optical fiber 102 is advantageous since it provides an abutting force and assures mechanical contact between the optical fibers in the mechanical splice. Sliding forward of sleeve 40 continues until it is fully seated on holder 30 and over-insertion is inhibited by stops 45. In this embodiment, sleeve 40 includes windows 44 disposed on opposite sides for cooperating with respective protrusions 38 on holder 30 for inhibiting unintended movement between the components. Stated another way, sleeve 40 is slid forward about holder 30 until protrusions 38 are held in windows 44 of sleeve 40. Sleeve 40 includes a suitably sized longitudinal passageway (not numbered) for fitting over holder 30 and squeezing the cantilevered arms into the cable jacket with the desired force.

FIGS. 8 and 9 depict cross-sectional views of the sleeve 40 being slid into position during assembly in orthogonal directions and FIG. 10 shows a cross-sectional view of cable assembly 10 along the same plane as FIG. 8. It is noted that the cross-sectional details of mechanical splice assembly 22 are omitted from FIGS. 8-10 for the purposes of simplicity. In preferred embodiments, the longitudinal passageway of sleeve 40 has a tapered passageway or a passageway that has a reduced dimension along a portion of its length (FIG. 8) in the direction for squeezing the teeth 35 and/or cantilevered arms 34a,34b of holder 30 into cable jacket 108. In other words, the forward opening of the passageway has opening sized for accommodating the fiber optic cable 100 that is loosely disposed in holder 30. As the holder 30 moves into the passageway of sleeve 40 the opening decreases in size in the desired direction, thereby forcing the cantilever arms 34a,34b together to grip the cable jacket 108 of fiber optic cable 100. By way of example, the passageway of sleeve 40 may reduce its size by about 0.004 inches (0.10 millimeters) to about 0.020 inches (0.50 millimeters) in the desired direction, but other suitable dimensions are possible. After the sleeve 40 is installed, the outer housing 50 can be attached to connector 20, thereby completing cable assembly 10. Specifically, outer housing 50 is slid over the front of mechanical splice assembly 22 of connector 20 and is secured to mechanical splice housing 21.

Figure 11:
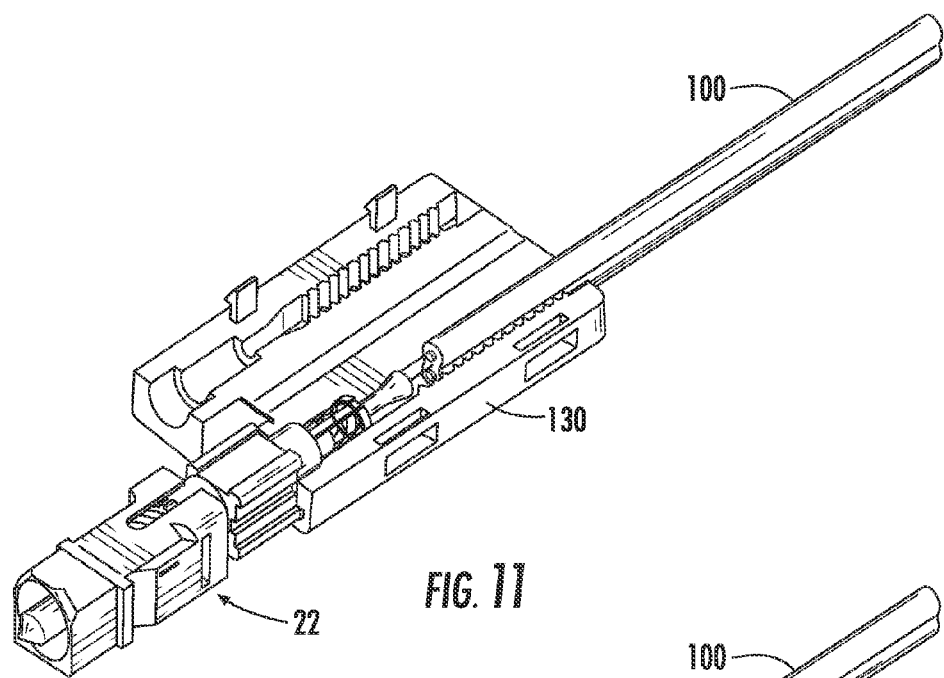
FIGS. 11-13 depict perspective views of another fiber optic connector being assembled.
Figure 12:
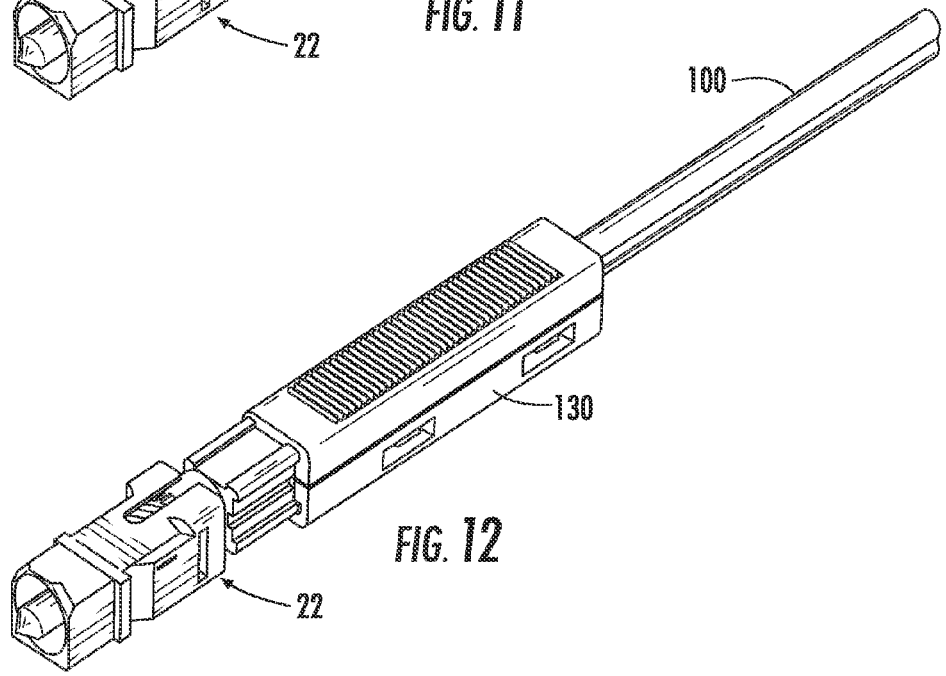

Additionally, other connectors using the concepts disclosed herein are possible. By way of example, FIGS. 11 and 12 depict perspective views of another fiber optic connector being assembled to form cable assembly 200 in FIG. 13. As shown in FIG. 11, holder 130 is a formed from a single piece and has a living hinge (not numbered) formed between an upper portion (not numbered) and a lower portion (not numbered) and is shown in an open position. As shown, the optical fiber of fiber optic cable 100 is inserted into the mechanical splice assembly 22 for optical connection. Like holder 30, holder 130 has a first end for attaching to a portion of the fiber optic connector (i.e., mechanical splice assembly 22) and a second end for securing such as by clamping to a portion of fiber optic cable 100 as shown. Holder 130 has an inner profile shaped to receive a portion of mechancical splice assembly 22 at the first end. Additionally, holder 130 includes a plurality of teeth (not numbered) on both the lower portion and the upper portion of the second end, but teeth could be disposed on just one portion if desired. Further, holder 130 has a plurality of latches (not numbered) on the upper portion that cooperate with a plurality of catches (not numbered) on the lower portion for securing the holder. FIG. 12 shows holder 130 after being closed about fiber optic cable 100 and mechanical splice assembly 22. This embodiment may or may not include a sleeve because the holder is secured (i.e., clamped) without the need of the sleeve, but the sleeve may be used to help close and/or maintain a closed position for holder 130. Thereafter, outer housing 150 is slid over the front of mechanical splice assembly 22 of the connector and is secured to mechanical splice housing 21.

Figure 13:
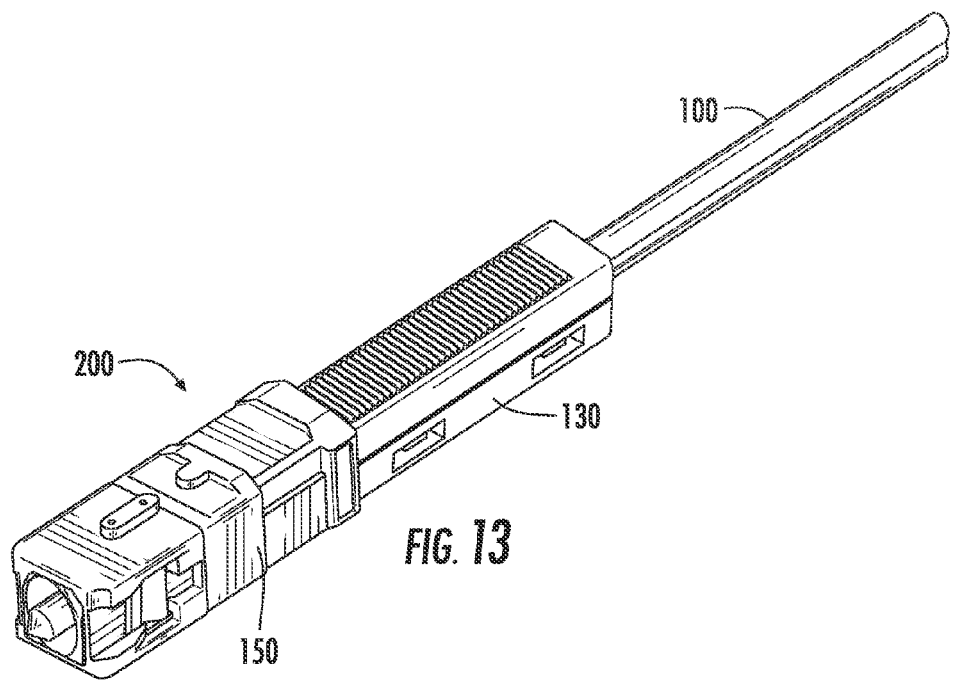
Figure 14:
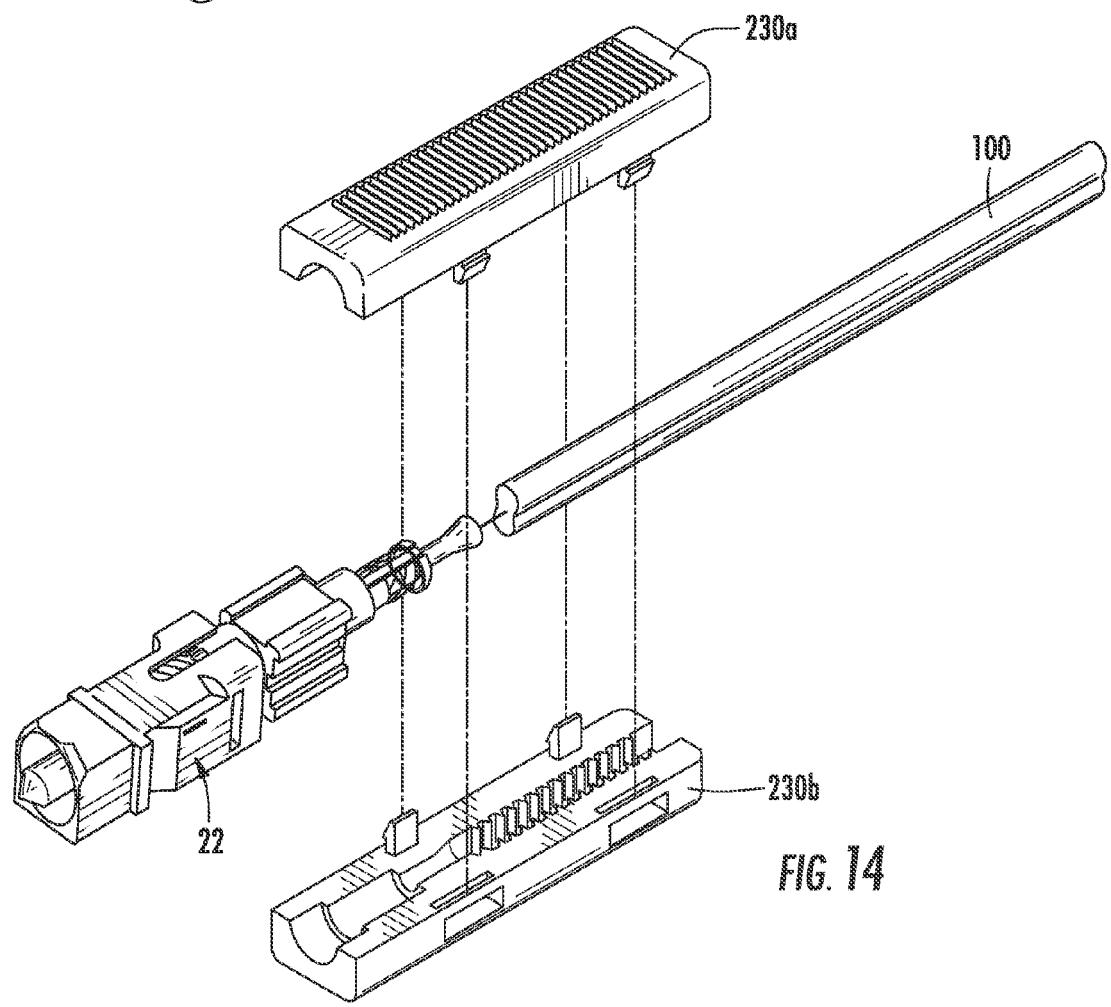

Still further variations of connectors according to the disclosed concepts are possible that are similar to FIGS. 11-13. By way of example, FIGS. 14 and 15 depict perspective views of another fiber optic connector being assembled to form cable assembly 300 in FIG. 16. As shown in FIG. 14, the holder has a two-piece construction formed from an upper portion 230a and a lower portion 230b as shown. As shown, upper portion 230a and 230b are preferably identical (i.e., two of the same component) to reduce the number of molds needed and complexity, but they may be different such as latches on one portion and catches on the other portion. As shown, the optical fiber of fiber optic cable 100 is inserted into the mechanical splice assembly 22 for optical connection. Like holder 130, the illustrated upper and lower portions 230a,230b have a first end for attaching to a portion of the fiber optic connector (i.e., mechanical splice assembly 22) and a second end for securing such as by clamping to a portion of fiber optic cable 100 as shown. Likewise, upper and lower portions 230a,230b include a plurality of teeth (not numbered), but teeth could be disposed on just one portion if desired. Upper and lower portions 230a,230b each include a plurality of latches (not numbered) and a plurality of catches (not numbered) for securing the same. FIG. 15 shows the holder after being assembled about fiber optic cable 100 and mechanical splice assembly 22. Again, this embodiment may or may not include a sleeve because the holder may be secured (i.e., clamped) without needing the sleeve, but the sleeve may be used to help close and/or maintain a closed position for the holder. Thereafter, outer housing 250 is slid over the front of mechanical splice assembly 22 of the connector and is secured to mechanical splice housing 21.

Other variations for the housing of the connector are also possible. FIG. 17 depicts a perspective views of another fiber optic connector partially assembled. As shown, holder 330 is a formed from a single piece and has a living hinge (not numbered) and is shown in an open position. In this embodiment, the living hinge is generally positioned transverse to the longitudinal axis, instead of positioned generally aligned with the longitudinal axis of the connector. As before, the optical fiber of fiber optic cable 100 is inserted into the mechanical splice assembly 22 for optical connection. Like the other holders, holder 330 has a first end for attaching to a portion of the fiber optic connector (i.e., mechanical splice assembly 22) and a second end for clamping to a portion of fiber optic cable 100 as shown. Holder 130 is attached to mechancical splice assembly 22 using a suitable method at the first end. Additionally, holder 330 includes a plurality of teeth (not numbered) on the upper portion that snaps into a lower portion of the second end, but teeth could be disposed on either or both portions if desired. Further, holder 330 has a snap-fit for securing to fiber optic cable 100, thereby providing the desired fiber optic cable retention force. This embodiment may or may not include a sleeve, but the sleeve may be used to help close and/or maintain a closed position for the holder. After closing the upper portion of holder 330 to secure fiber optic cable 100 the outer housing (not shown) is slid over and attaches to the front of mechanical splice assembly 22 (i.e., the mechanical splice housing 21 like the other designs).

Figure 18:
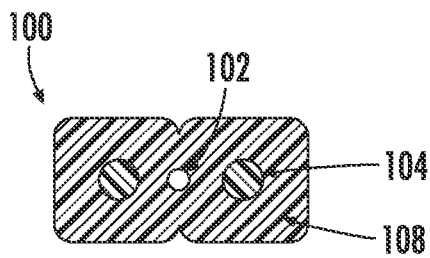
FIGS. 18-22 show explanatory fiber optic cables suitable for use with the cable assemblies disclosed herein.
Figure 19:
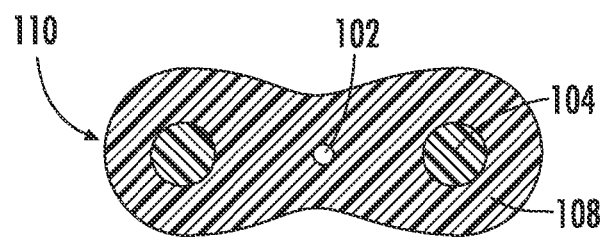

Connectors disclosed herein may use any suitable fiber optic cable. For instance, fiber optic cables can have different shapes and/or construction while being suitable with the connectors disclosed herein. For instance, the fiber optic cable can have cross-sectional shapes such as oval, flat, round, square, dogbone, or the like. By way of example, FIGS. 18-22 depicts cross-sectional views of exemplary fiber optic cables for use with connectors disclosed herein. FIG. 18 depicts a cross-sectional view of fiber optic cable 100, which includes optical fiber 102, a plurality of strength members 104 disposed on opposite sides of optical fiber 100, and a cable jacket 108. As shown, cable jacket 108 of fiber optic cable 100 includes notches (not numbered) at the top and bottom for providing the craft with easy access to optical fiber 100 by tearing apart the cable jacket. FIG. 19 shows another fiber optic cable 110 that has a larger cross-sectional profile with a dogbone shape for use with the disclosed connectors. The dogbone shape of fiber optic cable 110 allows the cable to withstand relatively large crush forces without experiencing undesirable levels of optical attenuation.

Figure 20:
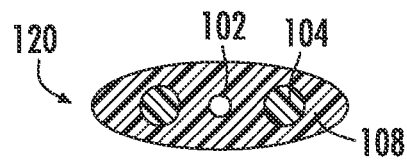
Figure 21:
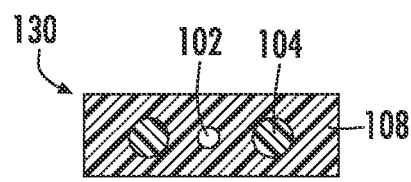
Figure 22:
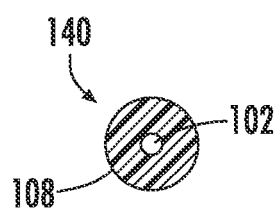

FIGS. 20-22 respectively show still other variations of fiber optic cables suitable with the disclosed connectors. FIGS. 20 and 21 respectively depict fiber optic cables 120 and 130 showing that other cable shapes are possible with the connectors and cable assemblies disclosed. FIG. 22 depicts a buffered optical fiber 140 having a round profile. Simply stated, the cables need not include a strength member. Other variations to the holder are also possible when different cable types and/or shapes are used. For instance, the holder may have a generally round profile for use with a round cable as shown in FIG. 22. Further, this round holder may include more than two cantilevered arms and use a sleeve with a tapered cylindrical passageway for squeezing the cantilevered arms into the cable jacket. But the round cable can also use holders as illustrated herein. Although, FIGS. 18-22 depict single fiber cables the concepts disclosed may also be used with multifiber cables and a suitable connector. By way of example, any of the fiber optic cables disclosed may have multiple optical fibers and the mechanical splice assembly would be suited for making an optical splice between multiple stub optical fibers and optical fibers of the cable.

Figure 23:
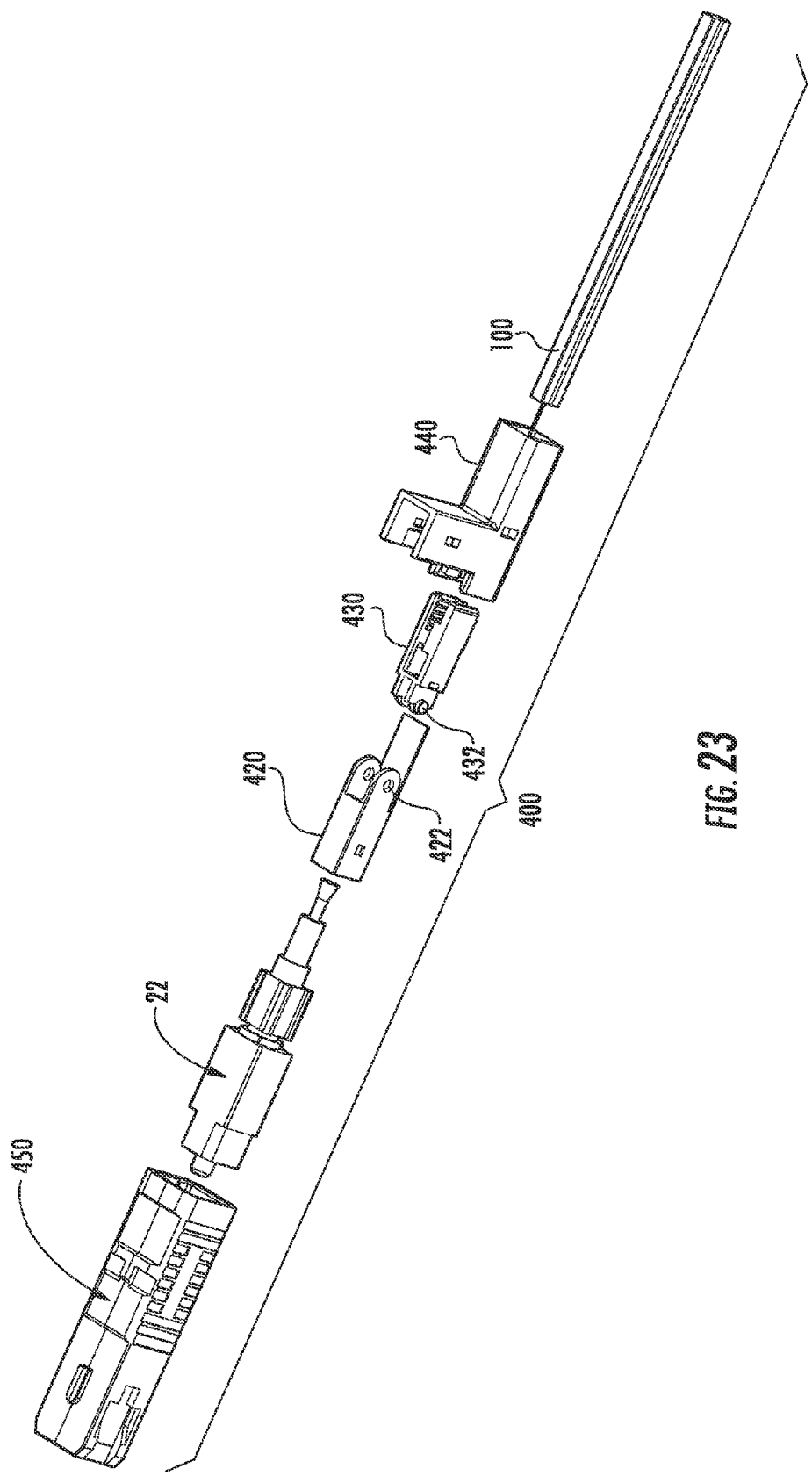

Still other variations are possible for the connectors. Illustratively, FIGS. 23 and 24 depict partially exploded perspective views of a cable assembly 400 similar to cable assembly 10, but having an angled connector (not numbered) according to the concepts disclosed herein. As shown, cable assembly 400 includes fiber optic cable 100, mechanical splice assembly 22, a holder (not numbered) formed by components 420 and 430, a sleeve 440, and an outer housing 450. The holder of this embodiment is similar to holder 30, but it has a two-piece construction that includes a pivot point. In other words, the holder shown has a first end (not numbered) on component 420 for attaching/securing to a portion of the fiber optic connector (i.e., mechanical splice assembly 22) by using an adhesive, epoxy, or other suitable attachment. Likewise, the holder has a second end on component 430 for securing such as by clamping or squeezing a portion of fiber optic cable 100 between cantilevered arms having teeth similar to holder 30. As before, the teeth of the holder can have any suitable number, shape or configuration such as canted forward.

As best shown in FIG. 23, the pivot point of the holder is formed between a plurality of apertures 422 on component 420 and a plurality of protrusions 432 on component 430 that snap-fit together, thereby providing pivoting between the components. After the holder is attached to the rear portion of mechanical splice assembly 22, the optical fiber of optical fiber cable 100 can be inserted into the mechanical splice assembly 22 for making the mechanical splice and then sleeve 440 can be positioned (i.e., slid over a portion of the holder) for securing the fiber optic cable thereto. In this embodiment, sleeve 440 has a passageway for sliding over a portion of component 430 of the holder, but it also includes an angled portion (shown pointing upward) for attaching to component 420. Specifically, after fiber optic cable 100 is secured using sleeve 440, the sleeve 440 is rotated at the pivot toward component 420 until sleeve is fully seated with respect to component 420. As shown, sleeve 440 has a plurality of windows (not numbered) for cooperating with a plurality of protrusions (not numbered) on component 420 that cooperate when fully seated for inhibiting unintended rotation of the assembly.

FIG. 24 depicts a nearly completed cable assembly 400. As depicted, fiber optic cable 100 is inserted into the connector and secured using sleeve 440 and sleeve 440 is rotated to the fully seated position on component 420 of the holder. Thereafter, cable assembly 400 can be completed by sliding outer housing 450 over the front of mechanical splice assembly 22 of the connector and securing the same to the mechanical splice housing. Although sleeve 440 of the connector is configured for a right-angle connector, it may be configured for other angles such as 45 degrees, 60 degrees, or other suitable angles. Of course, sleeve 440 can include other features like sleeve 40 such as a tapered passageway, stripping gauges, stops, cooperating structure for inhibiting unintended disassembly or the like.

Figure 25:
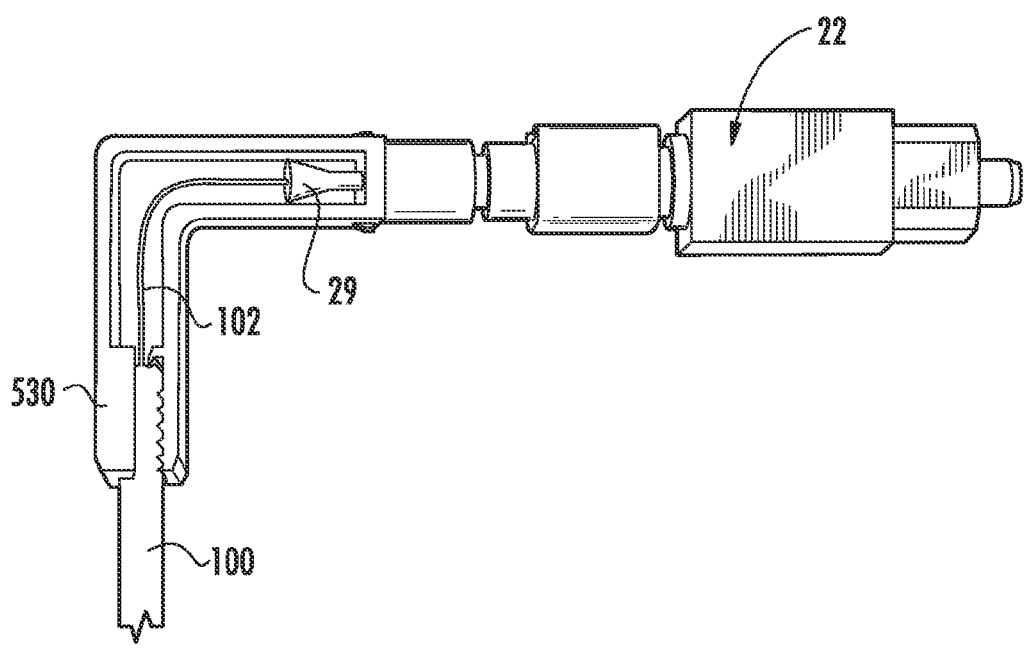
FIG. 25 shows a portion of another angled connector.

In a similar manner, the other connectors disclosed herein can be adapted for an angled configuration. For instance, FIG. 25 shows a partial perspective view of a variation on connector 20 for providing an angled connector/cable assembly. As shown, holder 530 is similar to holder 30, but includes cantilevered arms that are bent to form an angled connector. Holder 530 is formed in a right-angle, but the holder may be formed at any suitable angle such as 45 degrees, 60 degrees, or another suitable angle. The other components and assembly of this connector are similar to connector 20; however, this connector may further include a flexible sleeve and/or a flexible sleeve portion for placing about the bend portion of holder 530 for environmental protection.

One method of making a cable assembly disclosed and illustrated herein includes the steps of providing the fiber optic cable and the fiber optic connector and placing the holder about a portion of the fiber optic connector as shown in the figures. A portion of the fiber optic cable is positioned within a portion of the holder and then the holder is secured to the fiber optic cable. In specific embodiments, the holder includes at least one cantilevered arm and a sleeve is slid onto a portion of the holder. By way of example, the step of sliding the sleeve squeezes one or more of the cantilevered arms of the holder together for securing the fiber optic cable. In specific embodiments, placing of the holder about the fiber optic connector (i.e., the mechanical splice assembly) may include clamping, snap-fitting, using an adhesive, interference fit, crimping, threading, etc. Other method steps are also possible as discussed and illustrated herein.

It will be apparent to those skilled in the art that various modifications and variations can be made without departing from the spirit and scope of the invention. Thus, it is intended that the present invention cover the modifications and variations provided they come within the scope of the appended claims and their equivalents.

What is claimed is:

1. A fiber optic connector, comprising:
   a mechanical splice assembly that includes at least one ferrule and a stub optical fiber; and
   a holder, the holder having a first end with a passageway for attaching to a collar disposed at a rear end of the mechanical splice assembly and a second end for securing to a portion of a fiber optic cable.

2. The fiber optic connector of claim 1, wherein the holder includes a first cantilevered arm and a second cantilevered arm.

3. The fiber optic connector of claim 2, wherein the holder includes a first cantilevered arm having one or more gripping teeth and a second cantilevered arm has one or more gripping teeth.

4. The fiber optic connector of claim 1, further including a sleeve for securing the holder to the fiber optic cable.

5. The fiber optic connector of claim 4, wherein the sleeve includes a stripping gauge thereon.

6. The fiber optic connector of claim 1, wherein the holder has one or more stops.

7. The fiber optic connector of claim 1, wherein the holder has a living hinge or a two-piece construction.

8. The fiber optic connector of claim 1, further including a sleeve, the sleeve having a passageway for sliding onto a portion of the holder, wherein the passageway has a tapered portion.

9. The fiber optic connector of claim 8, wherein the holder and the sleeve have cooperating structure for inhibiting unintended disassembly.

10. The fiber optic connector of claim 1 being an angled fiber optic connector.

11. A fiber optic connector, comprising:
    a mechanical splice assembly that includes at least one ferrule and a stub optical fiber;
    a holder, the holder having a first end with a passageway for attaching to a collar disposed at a rear end of the mechanical splice assembly and a second end for clamping to a portion of a fiber optic cable, the second end having a first cantilevered arm and a second cantilevered arm; and a sleeve, the sleeve having a passageway for sliding onto a portion of the holder.

12. The fiber optic connector of claim 11, wherein the first cantilevered arm has one or more gripping teeth and the second cantilevered arm has one or more gripping teeth.

13. The fiber optic connector of claim 11, wherein the sleeve has a tapered passageway for securing the holder to the fiber optic cable.

14. The fiber optic connector of claim 11, wherein the holder has a stop.

15. The fiber optic connector of claim 11, wherein the fiber optic connector includes a mechanical splice assembly.

16. The fiber optic connector of claim 11, wherein the sleeve includes a stripping gauge thereon.

17. The fiber optic connector of claim 11, wherein the holder and the sleeve have cooperating structure for inhibiting unintended disassembly.

18. The fiber optic connector of claim 11 being an angled fiber optic connector.

19. A fiber optic cable assembly, comprising:
a fiber optic cable having at least one optical fiber;
a fiber optic connector having at least one ferrule;
a holder, the holder having a first end for attaching to a portion of a fiber optic connector and a second end for securing to a portion of the fiber optic cable; and
an sleeve, the sleeve having a passageway for sliding onto the fiber optic connector and a portion of the holder, thereby securing the holder to the fiber optic cable, wherein the assembly provides a fiber optic cable retention force of at least 10 Newtons.

20. The fiber optic cable assembly of claim 19, wherein the holder includes a first cantilevered arm and a second cantilevered arm for attachment to the fiber optic cable.

21. The fiber optic cable assembly of claim 19, wherein the holder includes a first cantilevered arm having one or more gripping teeth and a second cantilevered arm has one or more gripping teeth.

22. The fiber optic cable assembly of claim 19, wherein the sleeve has a tapered passageway for securing the holder to the fiber optic cable.

23. The fiber optic cable assembly of claim 19, wherein the holder has a stop.

24. The fiber optic cable assembly of claim 19, wherein the holder has a living hinge or a two-piece construction.

25. The fiber optic cable assembly of claim 19, wherein the fiber optic connector is a mechanical splice connector.

26. The fiber optic cable assembly of claim 19, wherein the connector is an angled connector.

27. A method for making a cable assembly, comprising the steps of:
providing a fiber optic cable;
providing a fiber optic connector;
placing the a holder about a portion of the fiber optic connector;
positioning a portion of the fiber optic cable within a portion of the holder; and
securing the holder to fiber optic cable, wherein the assembly provides a fiber optic cable retention force of at least 10 Newtons.

28. The method of claim 27, the step of securing comprising sliding a sleeve onto a portion of the holder.

29. The method of claim 28, wherein the step of sliding the sleeve squeezes at least one cantilevered arm of the holder for securing the fiber optic cable.

30. The method of claim 28, wherein the step of sliding the sleeve squeezes a first cantilevered arm and a second cantilevered of the holder together for securing the fiber optic cable.

31. The method of claim 27, wherein the holder includes one or more gripping teeth.

32. The method of claim 27, the step of placing the holder about a portion of the fiber optic connector further including using an adhesive to secure the holder.

33. The method of claim 27, wherein the step of providing a fiber optic connector comprises providing a mechanical splice fiber optic connector.

34. The method of claim 27, wherein the holder includes a living hinge or has a two-piece construction.

35. The method of claim 27, wherein the step of sliding the sleeve bends an optical fiber of the fiber optic cable.

36. The method of claim 27, wherein the fiber optic connector is an angled connector.

37. A method for making a cable assembly, comprising the steps of:
providing a fiber optic cable;
providing a fiber optic connector;
placing the a holder about a portion of the fiber optic cable and a portion of the fiber optic connector, wherein the holder has at least one cantilevered arm; and
sliding an sleeve onto a portion of the holder, thereby squeezing the at least one cantilevered arm of the holder onto the fiber optic cable for securing the holder thereto, wherein the assembly provides a fiber optic cable retention force of at least 10 Newtons.

38. The method of claim 37, wherein the step of sliding the sleeve squeezes a first cantilevered arm and a second cantilevered of the holder together for securing the fiber optic cable.

39. The method of claim 37, wherein the holder includes one or more gripping teeth.

40. The method of claim 37, further including the step of attaching the holder to the fiber optic connector using an adhesive.

41. The method of claim 37, wherein the step of providing a fiber optic connector comprises providing a mechanical splice fiber optic connector.

42. The method of claim 37, wherein the step of sliding the sleeve bends an optical fiber of the fiber optic cable.

43. The method of claim 37, wherein the fiber optic connector is an angled connector.

* * * * *